UNITED STATES PATENT OFFICE.

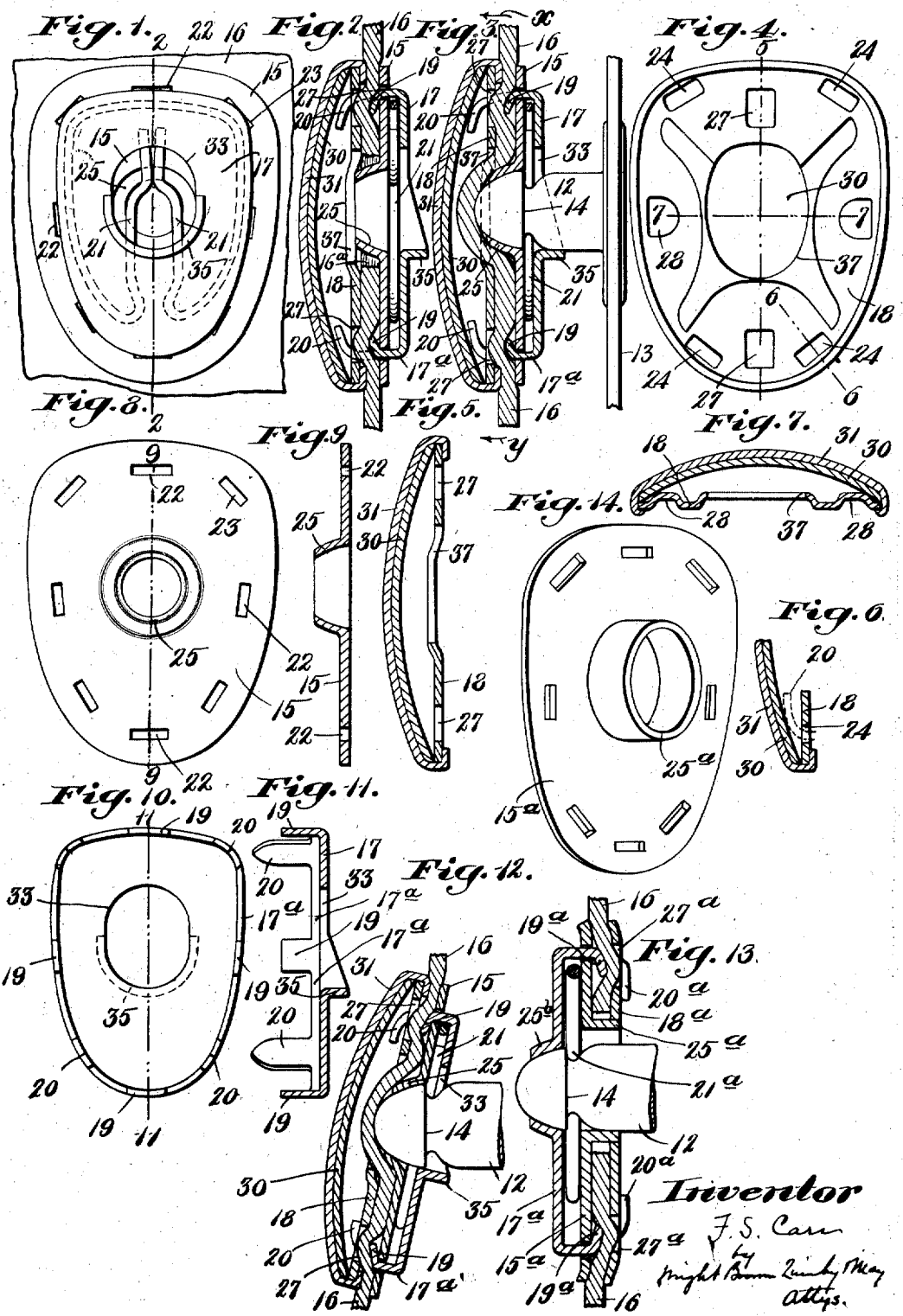
F. S. CARR.
STUD AND SOCKET FASTENER.
APPLICATION FILED MAY 3, 1917.
1,253,349. Patented Jan. 15, 1918.

FRED S. CARR, OF BROOKLINE, MASSACHUSETTS, ASSIGNOR TO CARR FASTENER COMPANY, OF CAMBRIDGE, MASSACHUSETTS, A CORPORATION OF MAINE.

STUD-AND-SOCKET FASTENER.

1,253,349.  Specification of Letters Patent.  Patented Jan. 15, 1918.

Application filed May 3, 1917. Serial No. 166,157.

*To all whom it may concern:*

Be it known that I, FRED S. CARR, a citizen of the United States, residing at Brookline, in the county of Norfolk and State of Massachusetts, have invented new and useful Improvements in Stud-and-Socket Fasteners, of which the following is a specification.

This invention relates to a stud-and-socket fastener, of the type disclosed in Letters Patent of the United States No. 1,038,288, and 1,184,319, said fastener including a cylindrical stud member provided at its inner end with means for attachment to an inner carrying part which is one of two parts separably connected by the fastener, the stud member being provided with an annular inwardly facing shoulder, and a socket member including metal plates assembled to form a jaw-confining casing, and provided with apertures to receive the stud member, and resilient jaws in said casing adapted to coöperate with the shouldered stud in confining the socket member in interlocked engagement with the stud member. The construction of a socket member of the class to which my invention relates is such that the assemblage of the said plates attaches the socket member as a whole to an outer carrying part which is the other of the two parts above mentioned. Provision is made, as set forth by the above-mentioned patents, for preventing separation of the members by a direct outward pull on the socket member, and for permitting such separation by a tipping movement of the socket member in one predetermined direction only.

The chief objects of the present invention are, to prevent rubbing or chafing contact between the members and wear which would be caused by such contact; to prevent the material of the said outer carrying part from obstructing the entrance of the stud member into the socket member, particularly when said carrying member is of textile fabric such as khaki cloth, and is liable to be frayed at the margin of a hole through which the stud member passes; and to prevent the portion of the carrying part which is interposed between two of the socket member plates from slipping or stretching.

Another object of the invention is to enable unyielding parts of the stud and socket members to resist strain tending to tip the socket member in a direction different from said predetermined direction, and relieve the jaws from the duty of withstanding said strain.

To these and other related ends the invention consists in the improvements which I will now proceed to describe and claim.

Of the accompanying drawings forming a part of this specification,—

Figure 1 is a side view of a socket member embodying the invention.

Fig. 2 is a section on line 2—2 of Fig. 1.

Fig. 3 is a view similar to Fig. 2, and a side view of the stud member.

Fig. 4 is a side view of one of the outer plates of the socket member.

Fig. 5 is a section on line 5—5 of Fig. 4.

Fig. 6 is a section on line 6—6 of Fig. 4.

Fig. 7 is a section on line 7—7 of Fig. 4.

Fig. 8 is a side view of the central plate of the socket member.

Fig. 9 is a section on line 9—9 of Fig. 8.

Fig. 10 is a side view of another outer plate.

Fig. 11 is a section on line 11—11 of Fig. 10.

Fig. 12 is a view similar to Fig. 3, showing the socket member tipped to disengage it from the stud member.

Fig. 13 is a view similar to Fig. 3, showing a modified construction of the socket member.

Fig. 14 is a perspective view of the central plate of the socket member shown by Fig. 13.

The same reference characters indicate the same parts in all of the figures.

Referring first to Figs. 1 to 12, inclusive, 12 represents the cylindrical stud member which is provided at its inner end with means for attachment to an inner carrying part 13, here shown as a sheet of flexible material, the stud member having a tapered or frusto-conical outer end and a peripheral groove between its ends, one side of said groove forming an annular inwardly facing shoulder 14.

The socket member includes a central plate 15, which is seated on the inner side of an outer carrying part 16, and two outer plates 17 and 18, at opposite sides of the central plate. In this embodiment of the invention, the plate 17 is at the inner side of the carrying part 16, and is called the rear plate, while the plate 18 is at the outer side of the carrying part, is seated on the outer side of the latter, and is called the front or clamping plate.

The plate 17 is provided with a narrow marginal flange 17ª (Fig. 11), on which are formed shorter prongs 19 and longer prongs 20. The flange 17ª is seated on one side of the central plate 15, and said flange and the plates 15 and 17 form a casing in which are confined two resilient wire jaws 21, adapted to spring into engagement with the stud shoulder 14 and lock the socket member to the stud. The shorter prongs 19 pass through slots 22 (Fig. 8) in the central plate and are clenched on one side of said plate. The longer prongs 20 pass through slots 23 in the central plate, through the carrying part 15, and through slots 24 (Fig. 4), in the front plate 18, said prongs being clenched on the front plate. The several plates are apertured to receive the stud member 12. The aperture in the plate 15 is necessarily formed to somewhat closely fit and embrace a portion of the stud member, and thus accurately locate the socket member with relation to the stud member, when the members are interengaged. Heretofore, the closely fitting or locating aperture has had a narrow wall determined by the thickness of the plate in which it is formed, and the portion of the stud member embraced by said wall has been objectionably chafed and worn by contact therewith. To overcome this objection, I provide one of the plates, preferably the central plate 15, with a locating aperture surrounded by an annular curb 25 formed internally to closely fit a relatively wide zone of the outer end portion of the stud member and present thereto a relatively wide bearing having practically no tendency to chafe and wear the embraced portion of the stud member, the width of said bearing being considerably greater than the thickness of the plate 15. Said curb and the stud zone embraced thereby are preferably tapered or frusto-conical, the curb constituting a recessed socket or seat which is held in close contact with the embraced zone of the stud by the engagement of the jaws 21 with the stud shoulder, and acts as a stop having a relatively wide bearing on the stud member and preventing end shake or independent movement of the socket member in the direction of the longitudinal axis of the stud member.

Another function of the curb 25 is to prevent the material of the carrying part 16 from encroaching on the space in the socket member occupied by the stud member. As shown by Fig. 2, the curb 25 projects into an aperture formed in the carrying part to accommodate the stud member, and constitutes a guard or wall preventing contact between the margin of said aperture and the stud member. Provision is thus made for preventing frayed or raveled edges of the aperture in the carrying part from interfering with the entrance of the stud member into the socket member.

The clenched portions of the shorter prongs 19 constitute dogs which indent the clamped portion of the carrying part 16 as shown by Figs. 2 and 3. The front plate 18 is provided with recesses into which the portions of the carrying part displaced by the said dogs are caused to bulge. As shown by Fig. 4, some of said recesses are formed by slots 27 in the front plate, while the other recesses are formed by indentations or bosses 28 pressed into the plate. The said dogs and recesses act effectively to prevent edgewise movement of the carrying part 16 between the plates 15 and 18, and prevent said part from tearing at the points where the longer prongs 20 pass through it. In this embodiment of the invention, the arrangement of the curb 25 to coöperate with the outer end portion of the stud member requires the location of the plate 17, which forms a part of the jaw casing, at the inner side of the carrying part, so that the clenched portions of its longer prongs 20 are at the outer side of the carrying part, and would be exposed to view, unless suitably covered. To cover and conceal the prongs 20, and provide a neat and desirable external finish, I secure to the front plate 18 a backing which includes a clenching or anvil plate 30, preferably of brass, and a covering or veneer plate 31, also preferably of brass. Said plates are of crowning form, as shown by Figs. 5 and 7, and their marginal portions bear on marginal portions of the front plate 18. The inner surface of the anvil plate 30 is spaced from the plate 18, so that when the prongs 20 are inserted in the slots 24 and forced endwise against the anvil plate, the latter acts to deflect and clench said prongs, as shown by Figs. 2 and 3. The margin of the covering plate 31 is rolled over the edges of the plates 18 and 30. The front plate 18 is suitably embossed to offset from the anvil plate, the portions in which the slots 24 and recesses 27, 28 are formed, spaces being thus formed for the reception of the prongs 20, as best shown by Fig. 6.

The stud-receiving aperture 33 in the rear outer plate 17 is elongated or oblong, and is so arranged that one end bears on one side of the stud member and resists a tipping movement of the socket member in the direction of the arrow x (Fig. 3), the other end of the aperture being spaced from the opposite side of the stud, so that it does not resist a tipping movement of the socket member in the direction of the arrow *y* and to the position shown by Fig. 12. This form and arrangement of the rear plate aperture, and the form and arrangement of the jaws 21, shown by Fig. 1, whereby said jaws are adapted to coöperate with the stud shoulder in permitting a tipping movement of the socket member in one direction only, and preventing tipping movements in all other directions, are substantially as disclosed by the prior patents hereinbefore mentioned, the rear outer plate being provided with a segmental wear-limiting lip or flange 35, as shown by said Patent No. 1,184,319. The front outer plate 18 has an enlarged aperture 37 which receives the outer end portions of the stud member and of the curb 25.

In the embodiment of the invention shown by Figs. 13 and 14 the central plate 15$^a$ is seated on the outer side of the carrying part, and is provided with a curb 25$^a$ which projects rearwardly through the orifice in the carrying part and into an orifice in the outer plate 18$^a$, which, in this case, is the rear plate and bears on the inner side of the carrying part. The plate 17$^a$ which forms a part of the jaw casing, is the front plate, and its shorter prongs 19$^a$ indent the carrying part and cause portions of it to bulge into recesses 27$^a$ in the rear plate. The curb 25$^a$ in this embodiment of the invention, does not prevent end shake, and does not coöperate like the curb 25 with the outer end portion of the stud member, its chief function being to exclude material of the carrying part from the space entered by the stud member. The curb 25$^a$ is elliptical, and is so formed and arranged that one end of its elliptical opening bears on one side of the stud member, while the opposite end is spaced from the opposite side of said member. The plate 17$^a$ may be provided with a supplemental curb 25$^b$ coöperating, like the curb 25 with the outer end portion of the stud member. The clenched portions of the prongs 20$^a$ are behind the carrying part and are therefore concealed, so that an anvil plate, such as that used with the embodiment first described, is not provided.

As already stated, the embraced zone of the outer end portion or head of the stud member, and the embracing curb 25 or 25$^b$ are preferably frusto-conical. There is a direct coöperation between the stud member having said frusto-conical zone, the frusto-conical curb closely fitting said zone, and the wide inner face bearing on the under side of the cylindrical stud body, and provided either by the flange 35, or by the lower side of the elliptical curb 25$^a$, as I will now explain.

When the carrying part 16 is subjected to pressure tending to tip it in the direction of the arrow *x*, this pressure is resisted, partly by the conjoint action of the under side of the stud body and the said inner bearing face, the latter being pressed upwardly against the stud body, and partly by the conjoint action of the upper side of the frusto-conical curb and the upper side of the frusto-conical zone of the stud, the upper side of the curb being at the same time pressed downwardly against said zone. A tipping movement of the socket member in the direction of the arrow *x* is therefore resisted independently of the jaws 21, this resistance relieving the jaws of practically all the duty of withstanding strain exerted in a direction different from the predetermined direction indicated by the arrow *y*. The width of the frusto-conical curb is much greater than the thickness of the plate on which the curb is formed, so that sufficient friction is caused by the downward pressure of the upper side of the curb on the upper side of the frusto-conical stud zone to strongly resist a sliding movement of the curb on the zone in the direction of the arrow *x*, wear of the contacting parts being eliminated.

The carrying part 16 may be provided with a hole to receive the curb, as shown by Fig. 2, or may extend continuously across the outer end of the stud member and across the outer edge of the curb 25, as shown by Figs. 3 and 12. In either case, the curb 25 prevents the carrying part from obstructing the opening in the plate 15, which receives the outer end portion of the stud, a portion of the carrying part shown by Figs. 3 and 12 being bulged outwardly by the curb and confined at one side of said opening.

It will be seen by reference to Figs. 3 and 12, that the jaw casing formed by the plates 15 and 17 is adapted to bear on the inner side of a flexible outer carrying part 16, that the curb 25 projecting from one side of said casing forms a recessed seat adapted to center the stud member relatively to the socket member, and to limit the entrance of the stud member into the jaw casing, and that the prongs 20, adapted to penetrate the carrying part and the outer or clenching plate 18 constitute a means for securing the jaw casing to the carrying part. It will also be seen that the limitation of the entering movement of the stud member by the curb or seat 25 permits the employment of a carrying part 16 which is not cut away to receive the stud member, and extends continuously across the seat 25 and across the outer end of the stud member, so that the entire tensile strength of the portion of the carrying part within the series of prongs 20 is utilized to resist strains tending to tear the carrying part at the points where the prongs pass through it.

In my application Serial No. 127,055, filed October 23, 1916, I have disclosed and specifically claimed a structure resembling that shown by Figs. 13 and 14, in all details excepting the curb 25$^b$ and the frusto-conical zone of the stud, said structure including the curb 25$^a$ surrounding the stud-receiving space between the plates 15$^a$ and 18$^a$. I do not therefore specifically claim in this application a structure which includes the curb 25$^a$ adapted to exclude the material of the carrying part 16 from the space between the front and back plates, said curb being claimed herein only as an element of a combination which includes the curb 25$^b$ and the frusto-conical zone on the stud.

I claim:

1. A socket member of a fastener which includes a shouldered stud member, said socket member comprising a central plate seated on one side of a carrying part and forming one side of a jaw casing, two outer plates at opposite sides of the central plate, one of said outer plates being seated on the opposite side of said carrying part, while the other outer plate is spaced from the central plate and forms the opposite side of the jaw casing, and resilient jaws confined in said casing and adapted to coöperate with the shouldered stud member, said plates being apertured to receive the stud member, and provided with means whereby they are interlocked with each other and with said carrying part, one of the plates being provided with an annular curb surrounding the stud-receiving aperture therein, and having a width considerably exceeding the thickness of the plate, said curb being formed and arranged to closely fit and have a relatively wide bearing on the outer end portion of the stud member, and limit wear of said member and of the plate on which the curb is formed.

2. A socket member as specified in claim 1, the said curb being substantially frusto-conical, and formed to closely fit a substantially frusto-conical zone of the stud member, and coöperate with said jaws in preventing loose movement of the socket member relatively to the stud member.

3. A socket member of a fastener which includes a shouldered stud member, said socket member comprising a central plate seated on one side of a carrying part and forming one side of a jaw casing, two outer plates at opposite sides of the central plate, one of said outer plates being seated on the opposite side of said carrying member, while the other outer plate is spaced from the central plate and forms the opposite side of the jaw casing, and resilient jaws confined in said casing and adapted to coöperate with the shouldered stud member, said plates being apertured to receive the stud member, one of said outer plates being provided with shorter prongs passing through slots in the central plate and clenched thereon to form dogs indenting the carrying part, and with longer prongs passing through the carrying part and through slots in the other outer plate and clenched on the latter, the last-mentioned outer plate being provided with recesses which receive the indented portions of the carrying part.

4. A socket member of a fastener which includes a shouldered stud member, said socket member comprising a central plate seated on one side of a carrying part and forming one side of a jaw casing, a rear outer plate seated on the central plate and forming therewith a jaw-confining casing, resilient jaws in said casing adapted to coöperate with said stud, said rear plate being provided with prongs passing through the carrying part and through slots in the front plate, and an anvil plate secured to the said outer plate and adapted to clench and conceal said longer prongs.

5. In combination, a stud member having a cylindrical body, a frusto-conical zone at the outer end of said body, and an inwardly facing shoulder between said zone and the cylindrical body, and a socket member comprising plates having apertures receiving said stud member and formed to permit a tipping movement of the socket member in one direction, shoulder-engaging jaws confined between two of said plates, and wear limiting means independent of said jaws coöperating with the stud member to resist a tipping movement of the socket member in another direction, said means comprising a wide segmental inner face on one of said plates contacting with the under side of the stud member body, and a wear limiting frusto-conical curb formed on and projecting outwardly from another plate and closely embracing said zone, said curb having a width considerably exceeding the thickness of the plate on which it is formed.

6. In a stud and socket fastener, in combination, a stud member attachable at the inner end to an inner carrying part, and having an inwardly facing shoulder between its inner and outer ends, and a socket member comprising a jaw casing formed to bear on the inner side of an outer carrying part, and having a stud-receiving orifice in its inner side permitting the insertion of the stud member, a recessed seat at its outer side formed to center the outer end of the stud member and constituting a stop adapted to limit the entrance of the stud member into the casing, resilient jaws in said casing adapted to yieldingly engage the stud shoulder and confine the outer end of the stud member against said seat, and means including a clamping plate adapted to be seated on the outer side of the flexible carrying part and prongs adapted to connect said clamping plate with the jaw casing and to penetrate the outer carrying part, for securing said casing to the said carrying part and clamping plate, the limitation of the entering movement of the stud member by said recessed seat permitting the employment of an outer carrying part extending continuously across the said seat and across the outer end of the stud member, and adapted to resist strains tending to tear the material at said prongs.

In testimony whereof I have affixed my signature.

F. S. CARR.